US012551313B2

(12) United States Patent
Schnabel (10) Patent No.: US 12,551,313 B2
(45) Date of Patent: Feb. 17, 2026

(54) DENTAL SCANNING

(71) Applicant: Dentsply Sirona Inc., York, PA (US)

(72) Inventor: Ruwen Schnabel, Darmstadt (DE)

(73) Assignee: Dentsply Sirona, Inc., York, PA (US)

( * ) Notice: Subject to any disclaimer, the term of this patent is extended or adjusted under 35 U.S.C. 154(b) by 306 days.

(21) Appl. No.: 18/555,325

(22) PCT Filed: Apr. 4, 2022

(86) PCT No.: PCT/EP2022/058892
§ 371 (c)(1),
(2) Date: Oct. 13, 2023

(87) PCT Pub. No.: WO2022/223275
PCT Pub. Date: Oct. 27, 2022

(65) Prior Publication Data
US 2024/0189065 A1    Jun. 13, 2024

(30) Foreign Application Priority Data

Apr. 23, 2021    (EP) .................................... 21020229

(51) Int. Cl.
*A61B 90/00* (2016.01)
*A61C 9/00* (2006.01)
(Continued)

(52) U.S. Cl.
CPC .......... *A61B 90/361* (2016.02); *A61C 9/0053* (2013.01); *A61B 2090/364* (2016.02);
(Continued)

(58) Field of Classification Search
None
See application file for complete search history.

(56) References Cited

U.S. PATENT DOCUMENTS 9,655,504 B1 * 5/2017 Elazar ..................... H05B 47/00
2003/0083719 A1 * 5/2003 Shankar ............. A61N 1/37211
607/60

(Continued)

OTHER PUBLICATIONS

International Search Report; PCT/EP/2022/058892; Jun. 24, 2022 (completed); Jul. 6, 2022 (mailed).
(Continued)

*Primary Examiner* — Haris Sabah
(74) *Attorney, Agent, or Firm* — SCHWEGMAN LUNDBERG & WOESSNER, P.A.

(57) ABSTRACT

The present teachings relate to a method for assisting an intraoral scan including providing an intraoral image of a patient, and providing an extraoral image; the extraoral image being representative of the position of an extraoral scanner part. The teaches further include generating, using the intraoral image and the extraoral image, a mapping function correlating the position of the extraoral scanner part with the position of the intraoral scanner part; and computing, using the mapping function, a desired extraoral position of the extraoral scanner part; the desired extraoral position corresponding to a preferable intraoral position of the intraoral scanner part. The present teachings also relate to a system, a device, a use, data, and a storage medium.

15 Claims, 4 Drawing Sheets

(51) Int. Cl.
G06F 3/048 (2013.01)
G06V 30/146 (2022.01)

(52) U.S. Cl.
CPC ........ *A61B 2090/371* (2016.02); *G06F 3/048* (2013.01); *G06V 30/1463* (2022.01)

(56) References Cited

U.S. PATENT DOCUMENTS

| | | | |
|---|---|---|---|
| 2012/0056993 A1* | 3/2012 | Luqman | A61B 1/00045 348/66 |
| 2012/0062557 A1* | 3/2012 | Dillon | A61C 7/002 345/419 |
| 2018/0192964 A1 | 7/2018 | Stalder | |
| 2019/0083212 A1 | 3/2019 | Cowburn | |
| 2021/0077233 A1 | 3/2021 | Yancey | |

OTHER PUBLICATIONS

Written Opinion of the International Searching Authority; PCT/EP/2022/058892; Jun. 24, 2022 (completed); Jul. 6, 2022 (mailed).

\* cited by examiner

DENTAL SCANNING

CROSS-REFERENCE TO RELATED APPLICATIONS

This is a National Phase application of International Application No. PCT/EP2022/058892, filed Apr. 4, 2022, which claims the benefit of and priority to European Application Ser. No. 21020229.7, filed on Apr. 23, 2021, which are herein incorporated by reference for all purposes.

FIELD OF THE INVENTION

The present teachings relate generally to methods, systems and computer software products for dental scanning.

BACKGROUND OF THE INVENTION

Dental scanners such as intraoral scanners are used for capturing digital dental impressions of a patient. The impressions may relate to features of interest of oral anatomy, such as teeth and/or soft and/or hard tissues in the patient's oral cavity. The impression may be digitally stored and/or transmitted to a dental practitioner.

In recent times, self-scanning or self-use type dental scanners have also been introduced. Such scanners can allow a patient to scan their own oral cavity, or in general allow non-practitioners to perform a scanning operation. This can save costs for the user as compared to having a dental practitioner or professional perform the scan. However, a disadvantage of such scanners can be that it may take longer time and/or several scan operations for an unskilled user of the scanner to achieve a good dental impression. Certain users may even become frustrated with having to repeat scanning operations for capturing a proper impression. Additionally, or alternatively, it is also possible that a given scanner is different in operation from another scanner, which may require that a new user adapts to the different kind of scanner prior to being able to obtain a good impression with that scanner.

US Patent application US2021077233A1 disclosed a system comprising a scanning device operable by a user to scan teeth of the user to acquire images of the teeth. The scanning device comprises a camera operable to acquire the images, a guide configured to orient the camera with respect to the teeth to facilitate acquisition of the images, and a server system configured to receive the images acquired by the scanning device and to develop a treatment plan for the user based on the received images.

A need is recognized for realizing a more user-friendly dental scanning approach.

SUMMARY OF THE INVENTION

At least some of the limitations associated with the foregoing can be overcome by the subject matter of the accompanying independent claims. At least some of the additional advantageous alternatives will be outlined in the dependent claims.

When viewed from a first perspective, there can be provided a computer-implemented method for assisting or performing an intraoral scan of a patient, which method comprises:
providing, via an intraoral scanner part, an intraoral image;
providing, via an image sensor, an extraoral image; wherein the extraoral image is representative of the position of an extraoral scanner part, said extraoral scanner part being rigidly connected to the intraoral scanner part,
generating, using the intraoral image and the extraoral image, a mapping function correlating the position of the extraoral scanner part with the position of the intraoral scanner part;
computing, using the mapping function, a desired extraoral position of the extraoral scanner part; wherein the desired extraoral position corresponds to a preferable intraoral position of the intraoral scanner part.

Also, there can be provided a computer-implemented method for assisting or performing an intraoral scan using a dental scanner comprising an intraoral scanner part rigidly connected to an extraoral scanner part, which method comprises:
providing, via the intraoral scanner part, an intraoral image;
providing, via an image sensor, an extraoral image; wherein the extraoral image is representative of position of the extraoral scanner part,
generating, using the intraoral image and the extraoral image, a mapping function correlating the position of the extraoral scanner part with the position of the intraoral scanner part;
computing, using the mapping function, a desired extraoral position of the extraoral scanner part; wherein the desired extraoral position corresponds to a preferable intraoral position of the intraoral scanner part.

The preferable intraoral position is a position at which the intraoral scanner part is to be present for capturing an image or scan of an area of interest of the oral anatomy. The preferable intraoral position may thus be a position of the intraoral scanner part where an image or scan above a certain quality level can be expected or obtained, and/or it may be a position where the intraoral scanner part should be relocated for obtaining the rest of the scan, e.g., progressing with the scan by capturing one or more further intraoral images. The applicant has realized that by doing so, the preferable intraoral position is obtained without the patient, or a user of the scanner, being required to monitor the placement of the scanning portion of the scanner, i.e., the intraoral scanner part. Most solutions available in the market today require the user to follow the scan sequence inside the oral cavity. For example, dental region or a part of the jaw may be shown on a display, which the user needs to track to fulfil the scan. At least in some cases, the patient may even be required to hold the oral cavity wide open to be able to track the actual position of the scanner with respect to the dental region. This can cause discomfort to the user, moreover it can result in confusion with respect to the orientation or direction in which the scanner should be moved in order to proceed with the scan.

The applicant has realized that by using the mapping function as disclosed, the position of the intraoral scanner part can be correlated, e.g., transformed, to the position of the extraoral scanner part, i.e., the part of the scanner which is outside of the oral cavity, which position can not only be independent of the opening of the oral cavity, but can also be used as a significantly easier target position for the user to adjust the scanner such that improved intraoral images are captured and/or the scan is carried out smoothly in the areas where it is needed in a more user-friendly fashion. The oral scan using the herein disclosed teachings can thus be more quickly completed. An additional advantage of the present teachings is that the placement of the image sensor can be automatically be accounted for via the mapping functions.

As it shall be discussed below, at least in some cases, the user may deploy the image sensor themselves, for example, using a mobile device with a camera for capturing the extraoral image. In such cases, the user may be required to place the device of the camera in a particular position to be able to follow the intraoral scanning process. This may place additional burden on the user to find an acceptable position for the camera and/or orientation of the face to be able to perform a scanning operation. In contrast, the mapping function can allow the position of the intraoral scanner part, or intraoral position, to be converted to the position of the extraoral scanner part, or extraoral position, such that the variability of the image sensor position is accounted for in computing the desired extraoral position. This can save time and effort for the user and the user can thus be enabled to perform the scanning operation quicker.

The mapping function may correlate the position of the extraoral scanner part with the position of the intraoral scanner part via a transformation of the coordinates of the intraoral scanner part to the coordinates of the extraoral scanner part. Thus, according to an aspect, coordinates of the intraoral scanner part are transformed to the coordinates of the extraoral scanner part, or vice versa. The coordinates may be related to the coordinates of the respective images, i.e., the intraoral image and the extraoral image. The mapping function can thus encapsulate the relationship between the coordinates of the intraoral image and the extraoral image. The relationship may thus be leveraged to compute the desired extraoral position such that the intraoral scanner part is at a preferable position, or vice versa. The mapping function may include the locational relationship between the intraoral part and the extraoral part.

Those skilled in the art shall appreciate that intraoral image and the extraoral image may be captured simultaneously or nearly simultaneously. This can be beneficial to account for any movement that the patient may have made between the two images.

The desired extraoral position can be leveraged in different ways, for example an output signal comprising information of the desired extraoral position can be provided. According to an aspect, the method also comprises:
generating an output signal indicative of the desired extraoral position.

The output signal may be provided to a human machine interface ("HMI") system or device. The HMI device may be a video device and/or an audio device. Thus, the HMI system may comprise a visual display for outputting visual instructions and/or an audio device for outputting audible instructions. For example, the HMI system may comprise a loudspeaker that audibly instructs or aids a user of the scanner to bring the position of the extraoral scanner part towards the desired extraoral position. For example, based upon the coordinates determined via the extraoral image, the HMI system may audibly inform the user to move the extraoral part to the left. As a further example, to notify the user that the desired extraoral position has been reached, a particular tone or beep may be played. The process may progress with audible instructions such that the scan is fully captured.

Additionally, or alternatively, the HMI device may comprise a visual display such as a video screen which visually instructs or aids the user of the scanner to bring the position of the extraoral scanner part towards the desired extraoral position. The display may be a screen such as an LCD or LED screen, and/or it may be an augmented reality ("AR") device. Thus, visual display may at least partly be an AR device or system. As an example, the desired extraoral position may be displayed in an overlaid manner over the real-time image or picture of the extraoral part showing the current position of the extraoral part. The user can then move the extraoral part towards the overlaid image depicting the desired extraoral position. As it will be appreciated from the above, when the extraoral part is moved or relocated such that the real-time image is aligned or essentially aligned with the overlaid image, the intraoral part has reached the preferred intraoral position which allows capturing of the scan from the preferred intraoral position, thus intuitively guiding the user without requiring the oral cavity being wide opened in the direction of the image sensor. Moreover, the scanning can be initiated without overly sensitive placement of the image sensor with respect to the oral cavity. A wider freedom can thus be allowed for the placement of the image sensor. For making it further use friendly and more accurate, the HMI may even show a direction, e.g., via an animation and/or an arrow, in which the extraoral part should be moved. Thus, the user can be guided via a path or locus for the extraoral path that should be followed to proceed with the scan. Alternatively, or in addition, the path may be subdivided into smaller segments of linear or essential linear nature. The user can thus be guided to move the extraoral path along these segments, e.g., sequentially. An advantage of doing so is that a more complex maneuver required for the intraoral part to be able to capture different parts of the oral anatomy is simplified into smaller segments along which a plurality of intraoral images captured can be used to build a complete scan or a three dimensional ("3D") model of the oral anatomy, for example, a digital model of dental geometry of the patient.

Thus, according to an aspect, the method also comprises:
instructing, via the HMI system, a path to the desired extraoral position.

There can thus be captured a second intraoral image at the desired position. Hence, according to an aspect, the method also comprises:
capturing, at or around the desired extraoral position, a second intraoral image.

The second intraoral image can be used for building and/or augmenting a digital model of the oral anatomy of the patient. Hence, according to an aspect, the method also comprises:
building or augmenting, using a plurality of intraoral images, a digital model of the patient's oral anatomy.

The digital model is preferably built using a plurality of those intraoral images that are captured corresponding to a plurality of desired extraoral positions.

The term "intraoral scanner" refers to a dental scanner that is usable for generating dental impressions for a patient. A dental impression in this context refers to a digital model obtained via 3D intraoral scanning of the patient's oral cavity. Thus, the intraoral scanner is usable for generating a digital model of the patient's mouth. The digital model may include representation of the patient's teeth and/or hard and/or soft tissues in and around the patient's gums. Such dental impressions may be usable for providing for the patient any one or more of: surgical templates, custom devices, prosthetic restorations, and orthodontic aligners.

The intraoral scanner is preferably a hand-held scanner, or it is a scanning system comprising a hand-held part.

The "intraoral scanner part" refers to that part, of the hand-held scanner or the hand-held part, which is at least partially inserted in the patient's oral cavity for performing the scanning operation. The intraoral scanner part, or intraoral part, may comprise a lens of a scanning device, for example, a camera, a 3D scanner, or any other scanning device that is capable of capturing images of oral anatomy. The intraoral part may even comprise a plurality of scanning devices of same or different types, i.e., any one or more the abovementioned. The scanning device for capturing the intraoral image may be located at any suitable location at the intraoral scanner part. Those skilled in the art shall appreciate that placement of the intraoral scanning device at a specific place on the intraoral part is not limiting to the scope or generality of the present teachings. As a non-limiting example, hand-held scanners or the hand-held parts of scanning systems may be wand shaped. In some cases, the hand-held part or wand may be coupled wirelessly, or via a cord or wire, to a processing unit. The processing unit may comprise one or more computer processors and memory for processing the scanned images from the hand-held part. Alternatively, or in addition, the hand-held part may comprise one or more computer processors and memory. In some cases, the processing unit may provide power to the hand-held part. It shall be appreciated that one end or a certain length from the tip section of such scanners which during scanning enters the patient's oral cavity or remains in close proximity of the oral cavity, is the intraoral scanner part. By "close proximity" it is here meant at a distance 2 cm or lower from the opening of the cavity.

The "extraoral scanner part" refers to that part of the hand-held scanner or the hand-held part, which remains outside the patient's oral cavity while performing the scanning operation. Generally, the part of the hand-held scanner or the hand-held part of the scanner that is more than 2 cm away from the anatomy being scanned and/or from opening of the oral cavity while scanning is the extraoral scanner part. The extraoral scanner part, or the extraoral part, is rigidly attached to the intraoral scanner part either directly or indirectly. There may or may not be other parts between the rigid attachment of the intraoral part and the extraoral part. As a non-limiting example, the extraoral part is a grip or handle which is held by the user for performing the scanning operation. It shall be appreciated that the part of the hand-held scanner or the hand-held part which is not the intraoral part may be considered the extraoral part. Defining a definite boundary between the intraoral part and the extraoral part is neither essential to the functioning of the present teachings, nor does it affect the generality or scope of the present teachings.

The term "intraoral image" refers to an image or scan of the oral anatomy, e.g., the teeth, of the patient. The intraoral image is thus captured by the intraoral scanning device after inserting the intraoral scanner part into the mouth of the patient. The scanning device thus captures images of the oral anatomy being scanned. From one or more of the intraoral images, any one or more characteristics such as size, shape, color, depth, orientation, distance may be extracted, e.g., via one or more computing units operatively coupled to the scanner. At least some of the characteristics are used to build and/or augment a model of the oral anatomy of the patient. The model may represent dental parts such as teeth and/or gums of the patient. The model may be built or augmented by combining a plurality of intraoral images.

The term "extraoral image" refers to an image captured outside of the mouth of the patient or the user. The extraoral image is thus captured via the image sensor that does not enter the mouth of the user or the patient, and is more than 2 cm away from the opening of the oral cavity of the patient. Preferably, the image sensor is at a distance several tens of centimeters away from the oral cavity of the patient while scanning.

It shall be appreciated that the terms "user" and "patient" may sometimes be interchangeably used in the present disclosure such that the user may be the patient and the patient may be the user. Without diverging from the generality or scope of the present teachings, in some cases, however, the user may be different from the patient. The user may thus be a person who is assisting another person who is the patient. For example, the user may be a parent of a child for whom a dental scan needs to be captured.

The "image sensor" may be any device that is suitable for capturing the position of the extraoral scanner part. More particularly, the image sensor may be a device capable of capturing images of two-dimensional ("2D") and/or 3D surfaces. Some non-limiting examples of the image sensor include non-contact transmit-receive type imaging devices such as based on time-of-flight ("ToF") measurements and/or triangulation type and/or conoscopic type and/or holographic type. Additionally, or alternatively, any other suitable kind of non-contact imaging device may be used, for example camera, hand-held 3D laser scanner, structured light 3D scanner, modulated light 3D scanner, and non-contact passive 3D scanners, for example based on any one or more of the types: stereoscopic, photometric, silhouette. The image sensor thus captures images of the extraoral scanner part. From one or more of the extraoral images, any one or more characteristics such as size, shape, color, depth, distance, orientation may be extracted, e.g., via one or more computing units operatively coupled to the scanner. In some cases, the image sensor may be operatively coupled to an electronic unit such as a computer or workstation which comprises at least one of the computing units. The coupling between the image sensor and the computing unit and/or electronic unit may be wireless, wired or their combination. In some cases, the electronic unit may even be a part of the image sensor. As some non-limiting examples, the image sensor may be a webcam that is wired or wirelessly connected to an electronic device. In some cases, the image sensor may even be integrated with, or be a part of, the electronic unit. For example, electronic devices with an integrated sensor such as laptop computer, smartphone, a tablet, or a wearable electronic device which comprise a camera. It will be appreciated that display and/or speaker of such devices may be used as the HMI for providing the output signal.

According to an aspect, the image sensor or the electronic unit uses an extraoral data-driven logic trained to detect one or more characteristics or features of the extraoral scanner part from the extraoral image. The training of the extraoral data-driven logic may be supervised learning and/or it may be unsupervised learning based on image data comprising a plurality of images of the extraoral part. Additionally, or alternatively, the extraoral part may be provided with a unique identifier, for example, one or more machine-readable codes. As a further example, the extraoral part may be provided with a barcode or a quick response ("QR") code that is readable via the extraoral image for determining the position of the extraoral scanner part. Further advantageously, the extraoral part may be provided a plurality of machine-readable codes using which a more detailed position, e.g., orientation of the extraoral part can be determined from the extraoral image. For example, by determining which of the codes are visible in a particular extraoral image, a more specific and detailed positioning of the extraoral part can be determined. This can thus be mapped to a more detailed positioning of the intraoral part using the mapping function. Additionally, or alternatively, the extraoral data-driven logic may be trained for detecting unique shape or contour related features or characteristics of the extraoral part. This can also result in similar advantages as discussed using multiple machine-readable codes. A further advantage of the extraoral data-driven logic trained for detecting unique shape or contour related features can be that it may be more robust against a failure to register a particular machine-readable code, for example, due to the code being partially covered or being unreadable due to any reason. In that respect, a combination of the extraoral data-driven logic and one or more machine readable codes can be more advantageous. Thus, according to an aspect the extraoral data-driven logic is also used for detecting one or more machine readable codes.

The term "data-driven" model or logic refers to computational logic or model that are trained with statistical and/or heuristic information from training dataset comprising big data. Such logic or model may be a so called "black-box" model that derives its functionality purely from the training dataset, or it can be a "grey-box" which also comprises an analytical or mechanistic logic part. Some non-limiting examples of data-driven logic are artificial neural networks ("ANNs") and convolutional neural networks ("CNNs").

The extraoral image may also be used for detection of at least one dental feature of the patient. Hence, according to an aspect, the method also comprises:

detecting, from the extraoral image, at least one dental feature of the patient.

In some cases, the image sensor may also get a view of the patient's oral anatomy. For example, while the patient is opening their mouth, some of the patient's teeth may be visible to the image sensor. In such cases, the image sensor or the processing unit coupled to it may extract one or more dental features from the extraoral image. By combining the intraoral image captured at or around the same time, with the extraoral image the mapping function and/or determination of the desired extraoral position can be further improved. This can, for example, be done by registering the position of the extraoral part with respect to the detected oral feature of the patient. Either the extraoral data-driven logic or a second extraoral data-driven logic may be used for detecting the dental features similar to as it was explained earlier. The logic may be trained using dental feature training data for enabling the detection of such features from the extraoral image.

According to an aspect, the dental feature is used for building and/or augmenting the digital model. For example, it may be used for initiating the building of the digital model. From the dental feature extracted from the extraoral image and the position of the extraoral part, it may be determined where the intraoral part is located along the oral anatomy of the patient. This can especially speed up the scanning process when the scan is started such that there are yet no, or few, intraoral images captured such that a majority of the model is yet incomplete. By more precisely establishing the intraoral position along the oral anatomy, the progression of the scan can be made faster.

According to an aspect, the dental feature is used to match a part of the extraoral image with the digital model. This can improve the mapping function for correlating the extraoral image with the intraoral image. This can make the positioning more accurate, and thus improve the scan efficiency for the user.

Additionally, or alternatively, the extraoral image may be used for detection of at least one non-dental feature of the patient. Hence, according to an aspect, the method also comprises:

detecting, from the extraoral image, at least one non-dental feature.

One or more of the non-dental features may be facial feature of the patient. Alternatively, or in addition, one or more non-dental features may be other body parts of the patient and/or the user. Alternatively, or in addition, one or more non-dental features may be other objects such as scanner cord or other objects that may be captured in the extraoral image. Detection of such non-dental features can be used for determining the position of the extraoral part more accurately and/or guiding the user to move certain objects away such that detection via the extraoral image can be improved by removing unwanted interference from objects and body parts that are not required in the field of view of the image sensor for performing the scan. Thus, rather than providing a more generic error message, the user may be guided to move specific objects from the extraoral image for proceeding efficiently with the scan.

As previously discussed, according to an aspect, the computation of the desired extraoral position may be performed also in response to the at least one non-dental feature of the patient. For example, how the nose of the patient is viewed in one or more extraoral images relative to the position of the extraoral part in those images can be used to compute more accurately the extraoral position. The processing unit coupled to the scanner may compute size of one or more of the non-dental features with respect to the size of the extraoral part and/or distance between any of the non-dental features with respect to the size of the extraoral part for improving the determination of the extraoral position.

Alternatively, or in addition, the computation of the desired extraoral position may involve overcoming an obstructing non-dental feature detected from the intraoral image and/or the extraoral image.

Either the extraoral data-driven logic, or the second extraoral data-driven logic, or another data-driven logic may be used for detecting the non-dental features similar to as it was explained earlier. The logic may be trained using non-dental feature training data for enabling the detection of such features from the extraoral image.

According to an aspect, the extraoral data-driven logic is executed or provided via a cloud-based service. This can be particularly advantageous when an electronic device, e.g., user's or patient's, is used for capturing the extraoral image. The extraoral image may be provided to the cloud-based service for feature detection and the output signal can be transmitted to the electronic device via the extraoral data-driven logic executed at the cloud-service. This way, it can be avoided that any resource heavy data processing associated with the scanning is done on the electronic device. Moreover, a wider compatibility can be afforded for different electronic devices without requiring that the electronic device must meet the requirements for executing the extraoral data-driven logic. According to an aspect, a plurality of extraoral images and their associated output signal are stored in a memory location, which may be a local database and/or a part of the cloud-based service. The plurality of extraoral images and their associated output signal can be provided as assist training data which data can be leveraged for improving feature detection as will also be explained later.

Alternatively, or in addition, similar to the processing of the extraoral image, processing of intraoral data, e.g., processing of one or more intraoral images may use data-driven logic that may run locally on the scanner side and/or as a part of the cloud-based service. The intraoral data-driven logic may either be a separate logic, or it may be a part of the extraoral data-driven logic.

Preferably, the extraoral image is also be provided to the visual HMI either directly or after processing.

The coupling between the image sensor and the computing unit and/or electronic unit may establish a bidirectional or a unidirectional communication channel between the image sensor and the computing unit and/or electronic unit. An example of a purely unidirectional communication is receiving at the computing unit image data comprising the extraoral image from the image sensor, without sending any data from the computing unit to the image sensor. Preferably, the communication is bidirectional, for example, sending control data to the image sensor, for example, for starting a capture of the extraoral image, ending the capture or scan of the extraoral image, and/or altering the characteristics of the extraoral image capture, for example, any one or more of, zooming to a particular area to be captured, and/or adjusting any one or more image characteristics such as exposure, light, speed, color, pan, or any other characteristics associated with the capture of the extraoral image.

Without diverging from the scope or generality of the present teachings, the intraoral image and the extraoral image may either be in the same format or type, or they may be in different formats. Either one or both of the intraoral image and the extraoral image may be a 3D image. By 3D image it is meant an image that includes a third dimension, for example depth. The 3D image may be captured with a multidimensional sensor, such as a stereoscopic camera, or it may be generated by combining two or more images captured at different locations, either simultaneously or in a temporal fashion, i.e., one after the other. An advantage of 3D image can be that it can provide additional axes of movement for improving the scan. The user can be guided not only in a plane, rather in a 3D space, for example, not only "left" or "right", but also "in" or "out", e.g., along the depth axis. Especially in combination with an AR display, the user can be guided with 3D movements such as rotational movements along multiple axes. If only one of the images or sensors are 3D type, the mapping function is also used to transform the 3D position by subdividing to two or more temporal 2D coordinates along different 2D planes. The user can be guided through desired positions along these 2D planes to achieve the desired 3D location.

In the context of the present teachings, a few non-limiting examples of a wireless coupling are Bluetooth®, WiFi™, Zigbee, cellular network (such as 4G, 5G, WiMAX®) or any other suitable standard or proprietary protocol for the image sensor to wirelessly provide extraoral image as extraoral image data. A few non-limiting examples of a wired coupling are USB™ (such as USB 2.0, USB 3.x, or even USB4), wired local area network ("LAN") e.g., Ethernet based, InfiBand, FireWire, or any other suitable standard or proprietary protocol for the image sensor to provide extraoral image data via a wired connection.

The data captured via the image sensor and/or the intraoral scanning device can be leveraged for improving future scanning operations. These data can be used for training one or more data-driven models for improving characteristics or feature detection, and/or improving the mapping function and/or the computation of desired extraoral position.

Hence, according to an aspect, the method also comprises:
providing, at a memory location, assist training data.
The assist training data may comprise the intraoral image preferably associated with their corresponding extraoral image and further preferably the second intraoral image. The assist training data may also comprise the determined desired extraoral position and/or the output signal associated with the respective image. As explained previously, the memory location may be any database either local or at least partially a cloud-based service.

Additionally, or alternatively, according to an aspect, the method may also comprise:
determining a confidence score related to the digital model.

Thus, the processing unit coupled to the scanner may determine the confidence score for one or more parts of the scan. For example, each or some of the intraoral images may be provided an individual confidence score. The confidence score associated with an image can be indictive of the quality of the scan. Thus, for parts of the model which do not have good enough confidence score, the desired extraoral position may be computed such that additional intraoral images can be captured, and a good quality digital model may be obtained. An advantage of doing so is that the user does not need to know which parts of the oral anatomy need to be rescanned. Utilizing the present teachings, the user can be simply presented with one or more desired extraoral positions to be followed as guided via the output signal to obtain the good quality model via additional intraoral images captured at the one or more desired extraoral positions. Thus, even if the model has, so called "gaps or data gaps", or regions with poor resolution or quality, the confidence score as provided to the parts of the model or the respective intraoral images can help fill such gaps without the user having to navigate to these sections of the oral anatomy. The confidence score may be provided via tags and/or contextualization data linked to the respective parts of the model or the respective intraoral images.

According to an aspect, the confidence score is also provided to the assist training data along with the respective intraoral images. Preferably the additional intraoral images are also provided to the assist training data.

The assist training data can thus be leveraged to improve one or more data-driven logic, such as the extraoral data-driven logic for remedying of data gaps, e.g., via a more accurate computation of desired extraoral position. Thus, according to an aspect, the computation of the desired extraoral position is done via a data-driven model trained with the assist training data.

It shall be appreciated that the computation of the desired extraoral position may be done in a real-time manner by generating a plurality of mapping functions from the respective intraoral and extraoral images.

The term "real-time" shall be clear to the persons of ordinary skill in the art. The term generally refers to systems or processes that produce response or result with little or no delay. Generally, the delay if any is less than 1 s, often in millisecond range or lower, or even in microsecond range or lower. As an example, the intraoral image and the corresponding extraoral image being captured in a real-time manner means that both these images are captured simultaneously or preferably with a delay less than 1 s.

The scanner may even be communicatively connectable to at least one computer network, wirelessly and/or via a wired connection. The computer network may even at least partially be the Internet. The scanner may either be directly connectable to the network or it may connect via the processing unit. Accordingly, the scanner and/or its processing unit may comprise at least one network interface or a connectivity interface for connecting to at least one network. It shall be appreciated that for communicatively connecting to the cloud service as discussed here, a network connection may be established via the network interface. Specifics of the network type or interface are not essential to the generality or scope of the present disclosure.

When viewed from another perspective, there can also be provided a device for assisting an intraoral dental scan, wherein the device is configured to perform any of the method steps herein disclosed.

For example, there can be provided a dental scan assisting device, wherein the device is configured to:
 operatively connect to a dental scanner for receiving an intraoral image generated via an intraoral scanner part of the dental scanner; and
 operatively connect to an image sensor for receiving an extraoral image of an extraoral scanner part of the dental scanner; the extraoral image being representative of position of the extraoral scanner part,
 generate, using the intraoral image and the extraoral image, a mapping function correlating the position of the extraoral scanner part with the position of the intraoral scanner part;
 compute, using the mapping function, a desired extraoral position of the extraoral scanner part; wherein the desired extraoral position corresponds to a preferable intraoral position of the intraoral scanner part.

When viewed from another perspective, there can also be provided the digital model, or a data storage medium storing the digital model, as generated from the method steps herein disclosed.

When viewed from another perspective, there can also be provided a dental scanning system, wherein the system is configured to perform any of the method steps herein disclosed.

For example, there can be provided a dental scanning system comprising:
 an image sensor;
 a dental scanner comprising an intraoral scanner part connected rigidly to an extraoral scanner part;
 a computing unit;
wherein the system is configured to:
 receive, at the computing unit, an intraoral image generated via the intraoral scanner part;
 receive, at the computing unit, an extraoral image of the extraoral scanner part; the extraoral image being representative of position of the extraoral scanner part,
 generate, using the intraoral image and the extraoral image, a mapping function correlating the position of the extraoral scanner part with the position of the intraoral scanner part;
 compute, using the mapping function, a desired extraoral position of the extraoral scanner part; wherein the desired extraoral position corresponds to a preferable intraoral position of the intraoral scanner part.

When viewed from another perspective, there can also be provided a computer software product, or a non-transitory computer-readable storage medium storing the program, comprising instructions which when executed by a suitable computing unit cause the computing unit to perform the steps of any of the above method steps herein disclosed.

When viewed from another perspective, there can also be provided an assist training data as generated in any of the method steps herein disclosed. It shall be appreciated that the assist training data represents a dataset that can be leveraged to improve the intraoral scan based on the desired extraoral positions as computed at least partially using a data-driven logic trained using the asset training data. There can even be provided a data storage medium storing the assist training data as generated in any of the method steps herein disclosed. The data storage medium can even be a cloud service.

When viewed from another perspective, there can also be provided a use of the assist training data as generated in any of the method steps herein disclosed for: training a data-driven model, and/or determination of a desired extraoral position and/or a preferable intraoral position. Alternatively, there can also be provided a method of computation of a desired extraoral position and/or a preferable intraoral position using a data-driven logic trained using the assist training data, wherein the method comprises inputting the data-driven logic with image data comprising an extraoral image and/or an intraoral image; and providing via an output of the data-driven logic the desired extraoral position and/or the preferable intraoral position.

A computer-readable data medium or carrier includes any suitable data storage device on which one or more sets of instructions (or software) are stored for implementing any one or more methodologies disclosed herein. The instructions may even reside partially, or completely, within the main memory and/or within the processor during execution thereof by the processing unit, computing unit, and main memory, which may constitute computer-readable storage media. The instructions may even be transmitted or received over a network via a network device.

The computer program for implementing one or more of the embodiments described herein may be stored and/or distributed on a suitable medium, such as an optical storage medium or a solid state medium supplied together with or as a part of another hardware, but may also be distributed in other forms, such as via the Internet or other wired or wireless telecommunication systems. However, the computer program may also be presented over a network like the World Wide Web and can be downloaded into the working memory of a data processor from such a network.

Furthermore, data carrier or a data storage medium for making a computer program product available for downloading can also be provided, which computer program product is arranged to perform a method according to any of the aspects herein disclosed.

When viewed from another perspective, there can also be provided a computing unit comprising the computer program code for performing the method herein disclosed. Also, there can be provided a computing unit operatively coupled to a memory storage comprising the computer program code for carrying out the method herein disclosed.

That two or more components are "operatively" coupled or connected shall be clear to those skilled in the art. In a non-limiting manner, this means that there may be at least one communicative connection between the coupled or connected components e.g., they are the network interface or any suitable interface. The communicative connection may either be fixed, or it may be removable. Moreover, the communicative connection may either be unidirectional, or it may be bidirectional. Furthermore, the communicative connection may be wired and/or wireless. In some cases, the communicative connection may also be used for providing control signals.

"Processing unit" or "computing unit" may comprise, or it may be, a processing means or computer processor such as a microprocessor, microcontroller, or the likes, having one or more computer processing cores.

"Computer processor" Refers to an arbitrary logic circuitry configured for performing basic operations of a computer or system, and/or, generally, to a device which is configured for performing calculations or logic operations.

In particular, the processing means or computer processor may be configured for processing basic instructions that drive the computer or system. As an example, the processing means or computer processor may comprise at least one arithmetic logic unit ("ALU"), at least one floating point unit ("FPU"), such as a math coprocessor or a numeric coprocessor, a plurality of registers, specifically registers configured for supplying operands to the ALU and storing results of operations, and a memory, such as an L1 and L2 cache memory. In particular, the processing means or computer processor may be a multi core processor. Specifically, the processing means or computer processor may be or may comprise a central processing unit ("CPU"). the processing means or computer processor may be a complex instruction set computing ("CISC") microprocessor, reduced instruction set computing microprocessor ("RISC"), Very long instruction word ("VLIW") microprocessor, a processor implementing other instruction sets or processors implementing a combination of instruction sets. The processing means may also be one or more special purpose processing devices such as an application specific integrated circuit ("ASIC"), a field programmable gate array ("FPGA"), a complex programmable logic device ("CPLD"), a digital signal processor ("DSP"), in next word processor, or the like. The methods, systems and devices disclosed herein may be implemented as software in a DSP, in a microcontroller, or in any other side processor such as hardware unit within an ASIC, CPLD, or FPGA. It is to be understood that the term processing means or processor may also refer to one or more processing devices, such as a distributed system of processing devices located across multiple computer systems (such as cloud computing), and is not limited to a single device unless otherwise specified.

"Connectivity interface" refers to a software and/or hardware interface for establishing communication such as transfer or exchange of signals or data. The communication may either be wired, or it may be wireless. Connectivity interface is preferably based on or it supports one or more communication protocols. The communication protocol may be a wireless protocol, for example: short distance communication protocol such as Bluetooth®, or Wi-Fi, or long communication protocols such as cellular or mobile network, for example, second generation cellular network ("2G"), 3G, 4G, long term evolution ("LTE"), or 5G. Alternatively, or in addition, the connectivity interface may even be based on proprietary short distance or long distance protocol. The connectivity interface may support any one or more standards and/or proprietary protocols.

"Network interface" refers to a device or a group of one or more hardware and/or software components that allow an operative connection with the network.

"Memory storage" May refer to a device for storage of information, in the form of data, in a suitable storage medium. Preferably, the memory storage is a digital storage suitable for storing the information in a digital form which is machine readable, for example digital data that are readable via a computer processor. The memory storage may thus be realized as a digital memory storage device that is readable by a computer processor. Further preferably, the memory storage on the digital memory storage device may also be manipulated by a computer processor. For example, any part of the data recorded on the digital memory storage device may be written and or erased and or overwritten, partially or wholly, with the new data by the computer processor.

"Network" discussed herein may be any suitable kind of data transmission medium, wired, wireless, or their combination. a specific kind of network is not limiting to the scope or generality of the present teachings. The network can hence refer to any suitable arbitrary interconnection between at least one communication end point to another communication end point. Network may comprise one or more distribution points, routers or other types of communication hardware. The interconnection of the network may be formed by means of physically hard wiring, optical and/or wireless radio frequency ("RF") methods. The network specifically may be, or it may comprise, a physical network fully or partially made by hard wiring, such as a fiber optical network or a network fully or partially made by electrically conductive cables or a combination thereof. The network may at least partially comprise the Internet.

BRIEF DESCRIPTION OF THE DRAWINGS

Certain aspects of the present teachings will now be discussed with reference to the accompanying drawings that explain said aspects by the way of examples. Since the generality of the present teachings is not dependent on it, the drawings may not be to scale. Certain features shown in the drawings may be logical features that are shown together with physical features for the sake of understanding and without affecting the generality or scope of the present teachings.

DETAILED DESCRIPTION OF THE INVENTION

In accordance with example aspects described herein, a method, system and computer readable storage media can be provided for assisting a dental scan.

Figure 1:
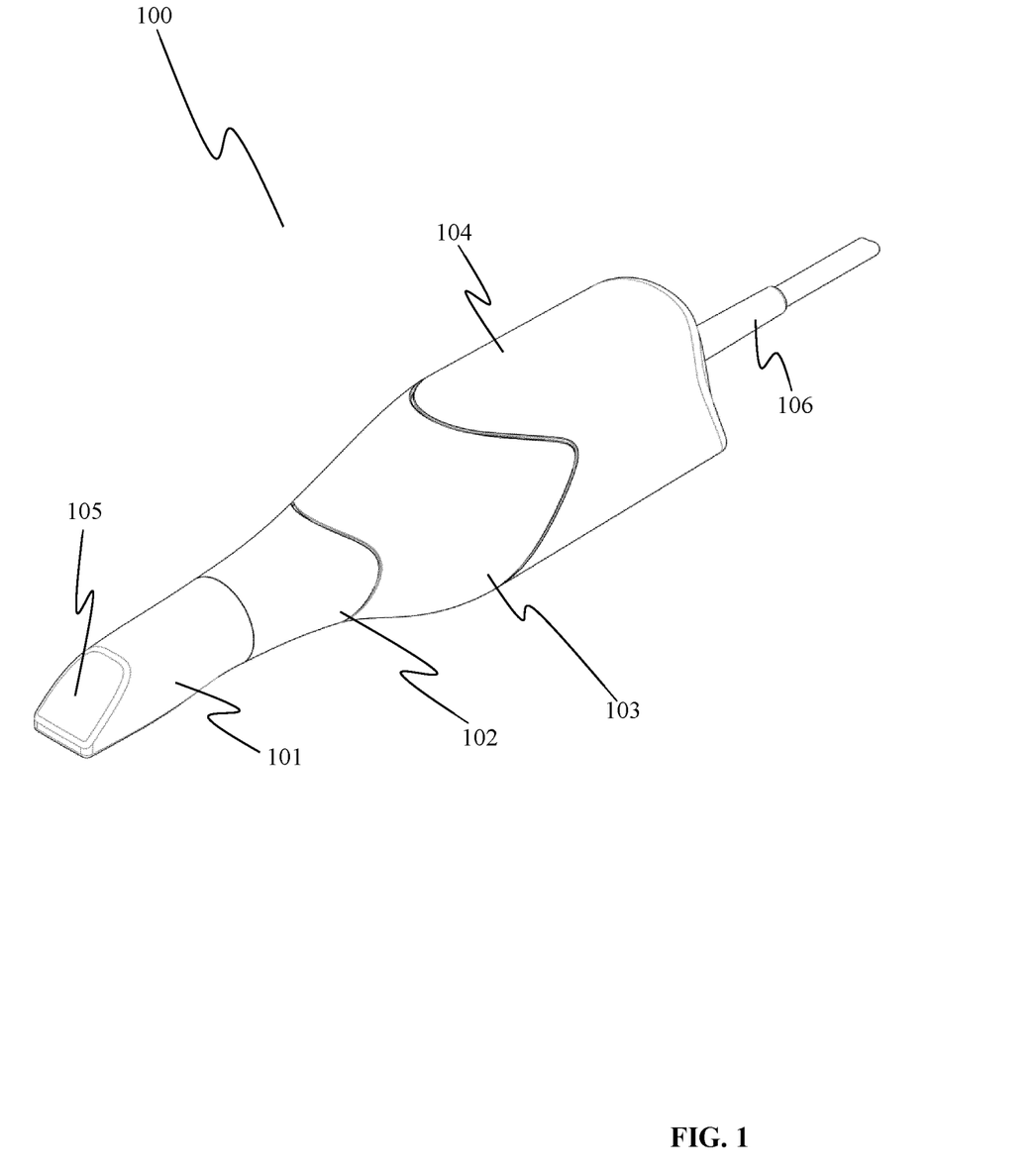
FIG. 1 illustrates a perspective view of a hand-held scanner.

FIG. 1 illustrates a hand-held dental scanner 100, or more generally called henceforth a scanner 100. The scanner 100 shown in this example is a hand-held part of a dental scanning system (not shown in FIG. 1). The scanner comprises a wire or cord 106 for operatively connecting to a processing unit. However, in some cases the scanner 100 may be a fully self-contained scanner, or it may be a scanner that wirelessly connects to the processing unit.

The scanner 100 comprises an intraoral part 101, which is at least partially inserted into the oral cavity of a patient for performing a scanning operation. The intraoral part 101 is rigidly connected to an extraoral part 102, 103 and 104 which remains outside the oral cavity during scanning. A specific and accurate demarcation of the boundary between the intraoral part 101 and the extraoral part 102 is not essential. The extraoral part is here shown made up of an extension length 102, and grip portions 103 and 104. The scanner 100 is held by a user or a patient via the grip portions 103 and/or 104. In this example, the intraoral part 101 and the extraoral part 102, 103 and 104 form the body of the scanner 100. The body may be in one piece or any two or more of the parts 101, 102, 103 and 104 may be joined in a rigid manner to form the body. The body may contain at least some of the electronics required to capturing an intraoral image. For example, the intraoral part 101 is shown comprising a scanning portion or device 105 for capturing the intraoral image. The scanning device 105 may be a camera, a 3D scanner, or any other device that is capable of capturing images of oral anatomy. The scanning device 105 may even comprise a plurality device, e.g., a plurality of cameras. The scanning device 105 may comprise one or more light sources for assisting in the capture of the intraoral image. The light source such as one or more light emitting diodes ("LEDs") or lamps may be used to illuminate the oral cavity.

Figure 2:
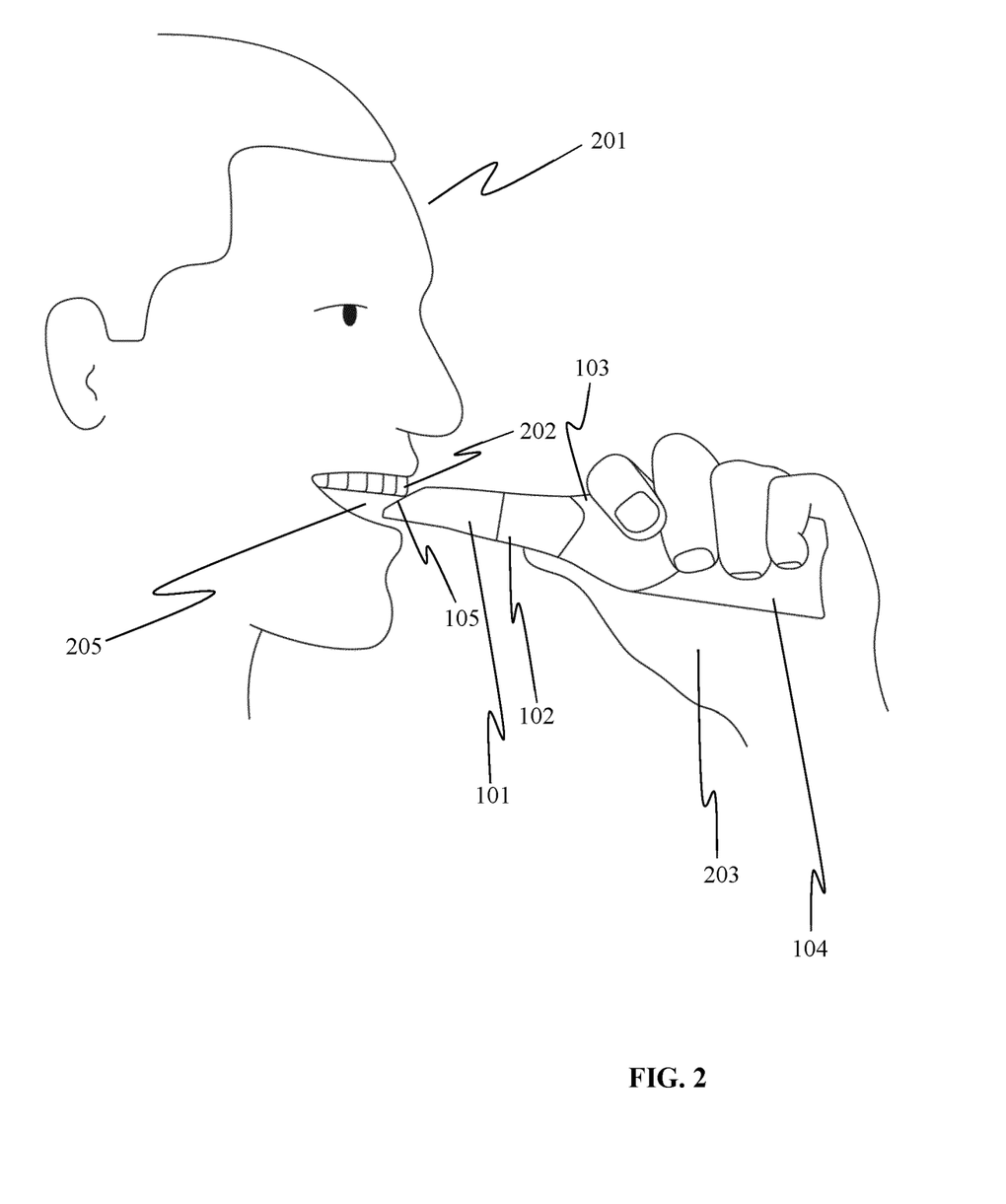
FIG. 2 illustrates a perspective view a hand-held scanner during use.

FIG. 2 illustrates the hand-held dental scanner 100 during use by a user 201 who in this case is also the patient. The scanner 100 in this example is shown as a wireless scanner. For performing the scanning operation, the user 201 inserts the intraoral part 101 at least partially in the oral cavity 205. The scanner 100 is being held by the user 201 by their hand 203 gripping the grip 104. As it shall be understood, the length of the intraoral part that is inside of the oral cavity 205 may depend upon the part of the cavity 205 being scanned. In this example, the user 201 is scanning their maxillary central incisors 202, so the scanning portion 105 is shown facing said incisors 202. If the user 201 is untrained in using the scanner 100, a problem with such self-scanning can be that the scanning operation can take longer time to complete. The user 201 may have to undergo trial-and-error type operation to perform the scan. For example, dependent upon the scanner, the scanning portion 105 may or may not have to touch the dental features 202 for capturing a good intraoral image. Sometimes, the scan may need to be repeated for certain portions of the oral anatomy, which can make it difficult for the user 201 to navigate to such portions of the mouth 205. In some cases, the intraoral image may be shown to the user, but not every user may be familiar with the oral anatomy, so trial-and-error type operation may still occur which can lead to frustration and/or the scan operation can take a much longer time than the user would have anticipated.

Figure 3:
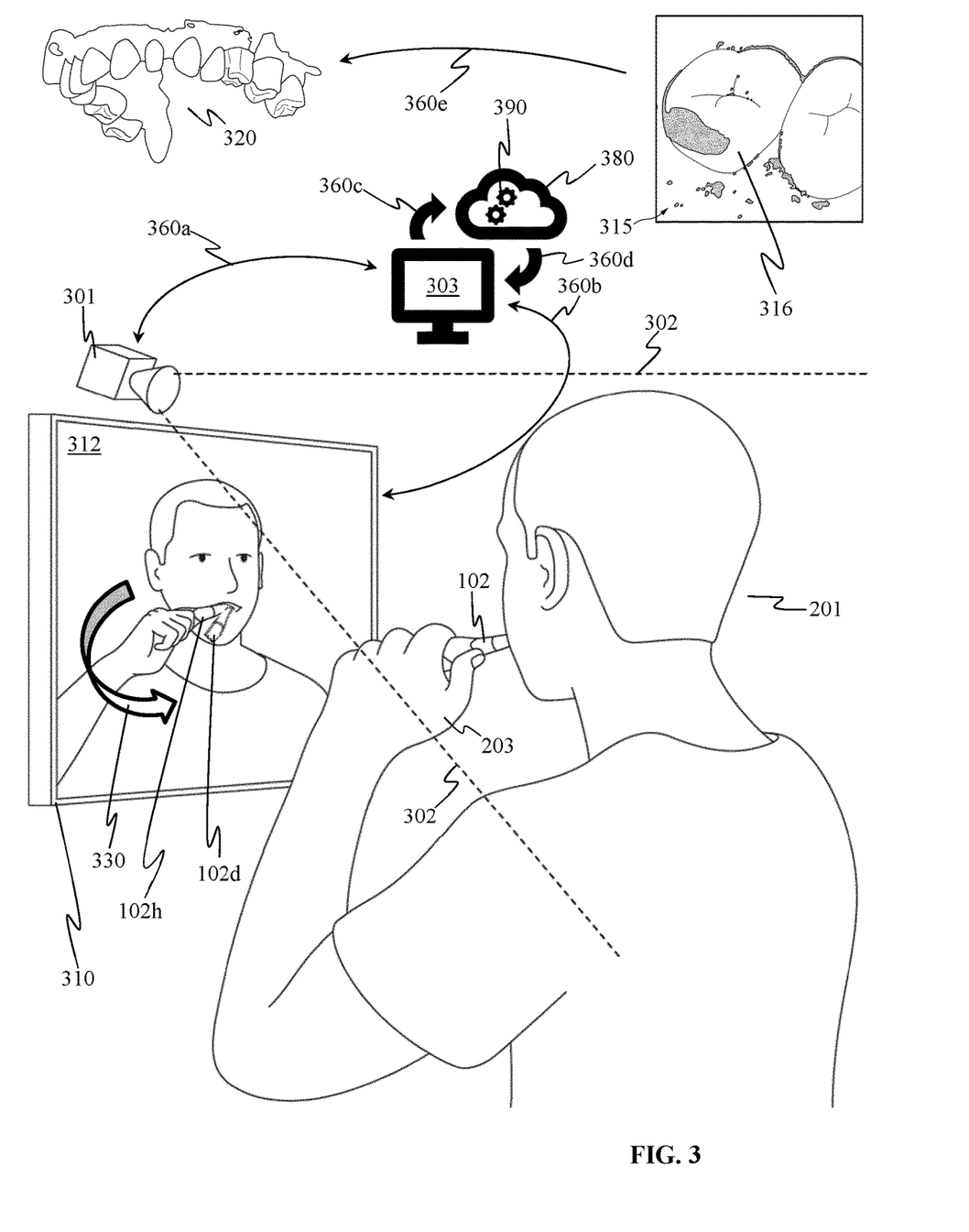
FIG. 3 illustrates a perspective view and a block diagram showing a dental scan assisting device or system.

FIG. 3 shows a perspective view and a block diagram illustrating multiple aspects of the present teachings. In addition to an intraoral image 315, it is also captured an extraoral image via an image sensor 301 shown here as a camera. The intraoral image 315 captures dental features of the patient, for example, image 316 of teeth. The camera 301 is shown to have a field of view 302 which may define the boundary of the extraoral image. As a preferable option, the extraoral image 312 can be provided to an HMI interface 310 shown here as a visual or video display 310. The extraoral image 312 can be provided to the screen 310 either in a raw form or after processing. Additionally, or alternatively, an audible HMI may be provided (not shown in FIG. 3). The scanner 100 operatively connects to a processing unit 303, which may or may not be a part of the scanner 100. In other words, the hand-held scanner 100 may either be a self-contained system, i.e., it comprises the processing unit 303 and/or other components such as a memory storage, or it may be operatively connected to any of such components, wired and/or wirelessly. The processing unit 303 comprises one or more computer processors and memory. The processing unit 303 is thus operatively connected to the dental scanner 100 for receiving the intraoral image 315 generated via the intraoral scanner part 101, or more specifically the scanning portion 105 of the intraoral scanner part 101. The processing unit 303 is also operatively connected to the image sensor 301 for receiving the extraoral image 102*h* of the extraoral scanner part 102 of the dental scanner 100. The extraoral image 312, or more specifically 102*h*, is representative of position of the extraoral scanner part 102. The processing unit 303 is configured to generate a mapping function correlating the position of the extraoral scanner part 102 with the position of the intraoral scanner part 101 or more specifically the scanning portion 105. The mapping function is generated using the intraoral image 315 and the extraoral image 312. An advantage of doing so is that the variability in placement of the image sensor 301 and/or the user's position and/or orientation is automatically captured via the mapping function. The processing unit 303 is thus configured to use the mapping function for computing a desired extraoral position 102*d* of the extraoral scanner part 102. The desired extraoral position 102*d* corresponds to a preferable intraoral position of the intraoral scanner part 101 or more specifically, the scanning portion 105 which is also a part of the intraoral part 101. It shall be appreciated that the processing unit 303 may even be at least partially a part of a cloud computing service 380. The scanner 100 may connect directly or via the processing unit 303 to the cloud service 380. Either the processing unit 303 and/or the cloud computing service 380 may comprise at least one data-driven model 390 for image processing of the intraoral image 315 and/or the extraoral image 312 and/or the computation of the desired extraoral position 102*d*. The desired extraoral position 102*d* is shown here provided, as an output signal, to the display 310. The desired extraoral position 102*d* is shown in an overlaid or superimposed manner to the real-time image of the user 201 on the screen 310. It can also be provided an animation, for example a direction or arrow 330, in which the extraoral part 102 should be moved such that extraoral part image 102*h* can be overlapped with the desired extraoral position 102*d*. Due to the mapping function, when this happens, the intraoral scanner part 101 will be in the preferred position for capturing a second intraoral image.

A plurality of intraoral images is used for building or augmenting a digital model 320 of the oral anatomy of the user or the patient 201. As it shall be appreciated, similar advantages can be enjoyed even if the user is not the patient.

Various operative or communicative connections 360*a-e* can either be internal within the processor or memory, or they may be network connections of the same or different types. For example, the processing unit 303 may operatively connect to the display 310 via an HDMI cable, while it connects to the scanner 100 via a Bluetooth® connection. In some cases, at least some of the devices or components may be the same unit. For example, the camera 301, the processing unit 303 and the display 310 may be parts of a smartphone or a tablet. Another example is that the intraoral image 315 is transmitted via a network connection 360*e* to the cloud service 380 where the digital model 320 is built. In some cases, the HMI system 310 may even be, or it may comprise an AR device such as head mounted augmented reality glasses, an HUD display, or a stereoscopic display capable of receiving stereoscopic video images.

Figure 4:
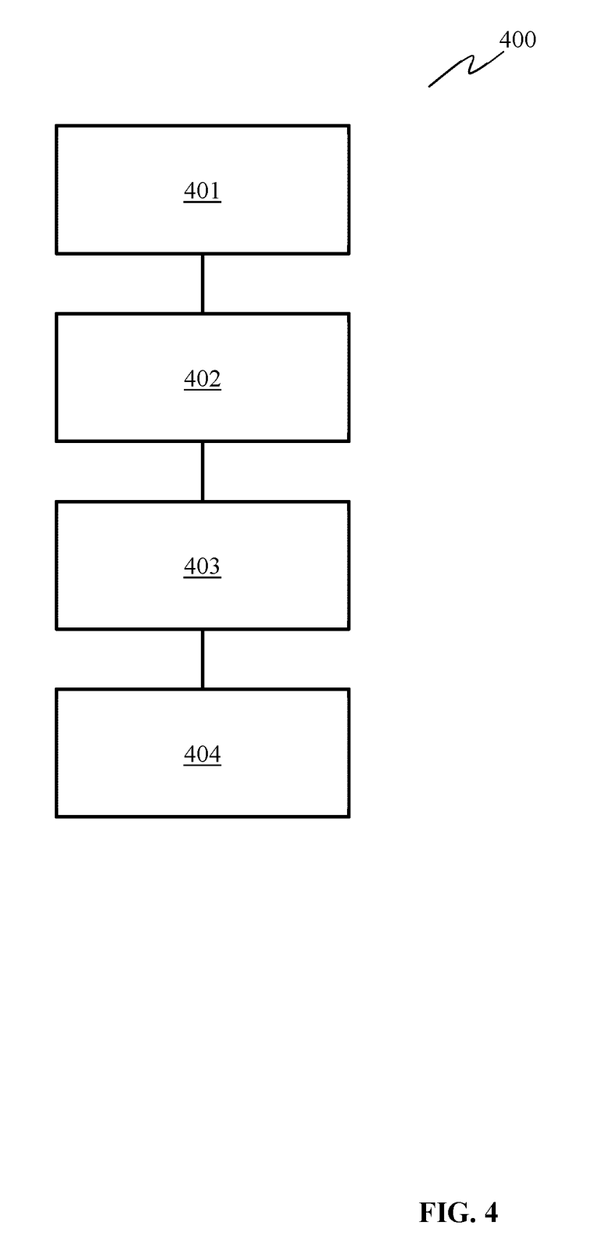
FIG. 4 is a flow chart showing a method aspect of the present teachings.

FIG. 4 shows a routine 400 for assisting an intraoral scan of a patient 201, where in block 401, it is provided, via an intraoral scanner part 101, an intraoral image 316 of the patient 201. In block 402, it is provided via the image sensor 301, an extraoral image 312. The extraoral image 312 is representative of the position of the extraoral scanner part 102. The extraoral scanner part 102 is rigidly connected to the intraoral scanner part 101. In block 403, it is generated, using the intraoral image 316 and the extraoral image 312, a mapping function correlating the position of the extraoral scanner part 102 with the position of the intraoral scanner part 101. In block 404, it is computed, using the mapping function, a desired extraoral position 102*d* of the extraoral scanner part 102. The desired extraoral position 102d corresponds to a preferable intraoral position of the intraoral scanner part 101.

The method steps may be performed in the order as shown listed in the examples or aspects. It should be noted, however, that under specific circumstances a different order may also be possible. Further, it is also possible to perform one or more of the method steps once or repeatedly. These steps may be repeated at regular or irregular time periods. Further, it is possible to perform two or more of the method steps simultaneously or in a timely overlapping fashion, specifically when some or more of the method steps are performed repeatedly. The method may comprise further steps which are not listed.

The word "comprising" does not exclude other elements or steps, and the indefinite article "a" or "an" does not exclude a plurality. A single processing means, processor or controller or other similar unit may fulfill the functions of several items recited in the claims. The mere fact that certain measures are recited in mutually different dependent claims does not indicate that a combination of these measures cannot be used to advantage. Any different signs in the claim should not be construed as limiting the scope.

Further, it should be noted that in the present disclosure, the terms "at least one", "one or more" or similar expressions indicating that a feature or element may be present once or more than once typically may have been used only once when introducing the respective feature or element. Thus, in some cases unless specifically stated otherwise, when referring to the respective feature or element, the expressions "at least one" or "one or more" may not have been repeated, notwithstanding the fact that the respective feature or element may be present once or more than once.

Further, the terms "preferably", "more preferably", "particularly", "more particularly", "specifically", "more specifically" or similar terms are used in conjunction with optional features, without restricting alternative possibilities. Thus, any features introduced by these terms are optional features and are not intended to restrict the scope of the claims in any way. The present teachings may, as those skilled in the art will recognize, be performed by using alternative features. Similarly, the features introduced by "according to one aspect" or similar expressions are intended to be optional features, without any restriction regarding alternatives to the present teachings, without any restrictions regarding the scope of the present teachings and without any restriction regarding the possibility of combining the features introduced in such way with other optional or non-optional features of the present teachings.

Unless otherwise defined, all technical and scientific terms used herein have the same meaning as commonly understood by one of ordinary skill in the art to which this invention belongs.

Various examples have been disclosed above for a method, a system, a device, a use, software program, and a computing unit comprising the computer program code for carrying out the methods herein disclosed. For example, it has been disclosed a method for assisting an intraoral scan comprising: providing an intraoral image of a patient, providing an extraoral image; wherein the extraoral image is representative of the position of an extraoral scanner part, generating, using the intraoral image and the extraoral image, a mapping function correlating the position of the extraoral scanner part with the position of the intraoral scanner part; computing, using the mapping function, a desired extraoral position of the extraoral scanner part; wherein the desired extraoral position corresponds to a preferable intraoral position of the intraoral scanner part. The present teachings also disclosed a system, a device, a use, data, and a storage medium. Those skilled in the art will understand however that changes and modifications may be made to those examples without departing from the spirit and scope of the accompanying claims and their equivalence. It will further be appreciated that aspects from the method and product embodiments discussed herein may be freely combined.

Any headings utilized within the description are for convenience only and have no legal or limiting effect.

Summarizing and without excluding further possible embodiments, certain example embodiments of the present teachings are summarized in the following clauses:

Clause 1. A computer-implemented method for assisting an intraoral scan, which method comprises:
  providing, via an intraoral scanner part, an intraoral image of a patient;
  providing, via an image sensor, an extraoral image; wherein the extraoral image is representative of the position of an extraoral scanner part, said extraoral scanner part being rigidly connected to the intraoral scanner part,
  generating, using the intraoral image and the extraoral image, a mapping function correlating the position of the extraoral scanner part with the position of the intraoral scanner part;
  computing, using the mapping function, a desired extraoral position of the extraoral scanner part; wherein the desired extraoral position corresponds to a preferable intraoral position of the intraoral scanner part.

Clause 2. The method according to clause 1, further comprising:
  generating an output signal indicative of the desired extraoral position.

Clause 3. The method according to clause 2, further comprising:
  providing the output signal to a human machine interface ("HMI") system.

Clause 4. The method according to clause 3, wherein the HMI system comprises an audio device for outputting audible instructions.

Clause 5. The method according to clause 3 or clause 4, wherein the HMI system comprises a visual display for outputting visual instructions.

Clause 6. The method according to clause 5, wherein the visual display is at least partly an augmented reality ("AR") system.

Clause 7. The method according to any of the clause 3-clause 5, further comprising:
  instructing, via the HMI system, a path to the desired extraoral position.

Clause 8. The method according to any of the above clauses, further comprising:
  capturing, at or around the desired extraoral position, a second intraoral image.

Clause 9. The method according to any of the above clauses, further comprising:
  providing, at a memory location, assist training data comprising the intraoral image and/or the extraoral image and/or the second intraoral image.

Clause 10. The method according to any of the above clauses, further comprising:

building, using a plurality of intraoral images especially those intraoral images captured at a plurality of desired extraoral positions, a digital model of the patient's oral anatomy.

Clause 11. The method according to any of the above clauses, further comprising:
detecting, from the extraoral image, at least one dental feature of the patient.

Clause 12. The method according to clause 11, wherein the at least one dental feature is used for building or augmenting the digital model, more particularly for initiating building of the digital model.

Clause 13. The method according to any of the above clauses, further comprising:
detecting, from the extraoral image, at least one non-dental feature of the patient.

Clause 14. The method according to clause 13, wherein the computation of the desired extraoral position is performed also in response to the at least one non-dental feature.

Clause 15. The method according to clause 13 or clause 14, wherein the computation of the desired extraoral position involves overcoming an obstructing non-dental feature detected from the intraoral image and/or the extraoral image.

Clause 16. The method according to any of the above clauses 10-15, further comprising:
determining a confidence score related to the digital model.

Clause 17. The method according to clause 16, wherein the computation of the desired extraoral position is performed in response to the confidence score.

Clause 18. The method according to clause 16 or clause 17, wherein the confidence score is also provided as the assist training data.

Clause 19. The method according to any of the clause 9-clause 18, wherein the computation of the desired extraoral position is done via a data-driven model trained with the assist training data.

Clause 20. The method according to any of the above clauses, wherein the computation of the desired extraoral position is done in a real-time manner by generating a plurality of mapping functions from the respective intraoral and extraoral images.

Clause 21. A device for assisting an intraoral dental scan, wherein the system is configured to perform the steps of any of the above method clauses.

Clause 22. A dental scan assisting device, wherein the device is configured to:
operatively connect to a dental scanner for receiving an intraoral image generated via an intraoral scanner part of the dental scanner; and
operatively connect to an image sensor for receiving an extraoral image of an extraoral scanner part of the dental scanner; the extraoral image being representative of position of the extraoral scanner part,
generate, using the intraoral image and the extraoral image, a mapping function correlating the position of the extraoral scanner part with the position of the intraoral scanner part;
compute, using the mapping function, a desired extraoral position of the extraoral scanner part; wherein the desired extraoral position corresponds to a preferable intraoral position of the intraoral scanner part.

Clause 23. A dental scanning system comprising:
an image sensor;
a dental scanner comprising an intraoral scanner part connected rigidly to an extraoral scanner part;
a computing unit;
wherein the system is configured to:
receive, at the computing unit, an intraoral image generated via the intraoral scanner part;
receive, at the computing unit, an extraoral image of the extraoral scanner part; the extraoral image being representative of position of the extraoral scanner part,
generate, using the intraoral image and the extraoral image, a mapping function correlating the position of the extraoral scanner part with the position of the intraoral scanner part;
compute, using the mapping function, a desired extraoral position of the extraoral scanner part; wherein the desired extraoral position corresponds to a preferable intraoral position of the intraoral scanner part.

Clause 24. A computer software product, or a non-transitory computer-readable storage medium storing the program, comprising instructions which when executed by a suitable computing unit cause the computing unit to perform the steps of any of the above method clauses.

Clause 25. Assist training data as generated in any of the above method clauses 9-20.

Clause 26. Use of the assist training data as generated in any of the above method clauses 9-20 for: training a data-driven model, and/or determination of a desired extraoral position and/or a preferable intraoral position.

Clause 27. A data storage medium storing the assist training data as generated in any of the above method clauses 9-20.

Clause 28. The digital model, or a data storage medium storing the model, as generated in any of the above method clauses 10-20

The invention claimed is:

1. A computer-implemented method for assisting an intraoral scan, comprising:
providing, via an intraoral scanner part, an intraoral image of a patient;
providing, via an image sensor, an extraoral image; wherein the extraoral image is representative of the position of an extraoral scanner part, said extraoral scanner part being rigidly connected to the intraoral scanner part,
generating, using the intraoral image and the extraoral image, a mapping function correlating the position of the extraoral scanner part with the position of the intraoral scanner part;
computing, using the mapping function, a desired extraoral position of the extraoral scanner part; wherein the desired extraoral position corresponds to a preferable intraoral position of the intraoral scanner part.

2. The method according to claim 1, further comprising:
generating an output signal indicative of the desired extraoral position.

3. The method according to claim 2, further comprising:
providing the output signal to a human machine interface ("HMI") system;
instructing, via the HMI system, a path to the desired extraoral position.

4. The method according to claim 1, further comprising:
providing, at a memory location, assist training data comprising the intraoral image and/or the extraoral image.

5. The method according to claim 1, further comprising:
building, using a plurality of intraoral images, a digital model of the patient's oral anatomy.

6. The method according to claim 5, further comprising:
detecting, from the extraoral image, at least one dental feature of the patient; wherein the at least one dental feature is used for building or augmenting the digital model.

7. The method according to claim 5, further comprising:
detecting, from the extraoral image, at least one non-dental feature of the patient.

8. The method according to claim 7, wherein the computation of the desired extraoral position is performed in response to the at least one non-dental feature.

9. The method according to claim 7, wherein the computation of the desired extraoral position involves overcoming an obstructing non-dental feature detected from the intraoral image and/or the extraoral image.

10. The method according to claim 5, further comprising:
determining a confidence score related to the digital model.

11. The method according to claim 10, wherein the computation of the desired extraoral position is performed in response to the confidence score.

12. The method according to claim 10, wherein the confidence score is also provided as the assist training data.

13. The method according to claim 5, wherein the plurality of intraoral images are intraoral images captured at a plurality of desired extraoral positions.

14. A system comprising:
an intraoral scanner part, an image sensor, and a processor configured to:
provide, via the intraoral scanner part, an intraoral image of a patient;
provide, via the image sensor, an extraoral image; wherein the extraoral image is representative of the position of an extraoral scanner part, said extraoral scanner part being rigidly connected to the intraoral scanner part,
generate, using the intraoral image and the extraoral image, a mapping function correlating the position of the extraoral scanner part with the position of the intraoral scanner part; and,
compute, using the mapping function, a desired extraoral position of the extraoral scanner part; wherein the desired extraoral position corresponds to a preferable intraoral position of the intraoral scanner part.

15. A non-transitory computer-readable storage medium storing a program, comprising instructions which when executed by processor causes a computer system to
provide, via the intraoral scanner part, an intraoral image of a patient;
providing, via the image sensor, an extraoral image; wherein the extraoral image is representative of the position of an extraoral scanner part, said extraoral scanner part being rigidly connected to the intraoral scanner part,
generate, using the intraoral image and the extraoral image, a mapping function correlating the position of the extraoral scanner part with the position of the intraoral scanner part; and,
compute, using the mapping function, a desired extraoral position of the extraoral scanner part; wherein the desired extraoral position corresponds to a preferable intraoral position of the intraoral scanner part.

\* \* \* \* \*